2,794,020

6-AMINO SUBSTITUTED 1,2,3,4-TETRAHYDRO-QUINOLINES

James O. Harris, St. Albans, and Ching C. Tung, Nitro, W. Va., assignors to Monsanto Chemical Company, St. Louis, Mo., a corporation of Delaware No Drawing. Application August 3, 1953, Serial No. 372,154

7 Claims. (Cl. 260—288)

The present invention relates to new and useful compositions of matter. More particularly it relates to 6-amino substituted 1,2,3,4-tetrahydroquinolines and to the method for their preparation.

The new class of compounds may be represented by the general formula

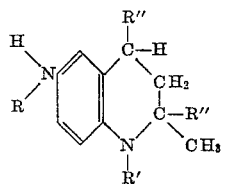

where R and R' represent hydrogen, alkyl, aralkyl or alicyclic groups and R" represents an alkyl group. Typical examples of R and R' are methyl, ethyl, propyl, isopropyl, butyl, amyl, octyl and dodecyl radicals. Also included are alicyclic radicals, as for example cyclohexyl, and aralkyl radicals, as for example benzyl and phenethyl. R" is a short chain alkyl radical such as methyl, ethyl, propyl, or butyl.

The new compounds possess valuable properties which render them suitable for a number of uses, outstanding of which is an adjuvant for rubber compounding. One of the major problems of the rubber industry is protection of natural and synthetic rubber goods against exposure cracking, that is degradation due to ozone while the rubber article is under either static or dynamic stress. The problem is a difficult one and is aggravated by the fact that in general chemical antioxidants or age retarders have little or no value in protecting against deterioration by ozone.

The following examples of the invention illustrate the preparation of the new compounds in detail:

Example 1

1,2-dihydro-2,2,4-trimethylquinoline was hydrogenated over a platinum or palladium catalyst in a Parr hydrogenator. Into the hydrogenator was charged 74.2 grams of 1,2-dihydro-2,2,4-trimethylquinoline, B. P. 105–125° C./6–8 mm., M. P. 10–16° C. The initial hydrogen pressure was 63.2 pounds per square inch and then after 2 hours and 35 minutes the final pressure was 30.8 pounds per square inch. This drop in pressure of 32.4 pounds per square inch corresponds to a theoretical pressure drop of 34.2 pounds per square inch obtained from previous calibration data on the instrument. A yield of 72 grams of 1,2,3,4-tetrahydro-2,2,4-trimethylquinoline was obtained.

Into a reactor fitted with a reflux condenser was charged 99 grams of 1,2,3,4-tetrahydro-2,2,4-trimethylquinoline, 80.6 grams of methyl iodide, 62.6 grams of sodium carbonate and 626 grams of water. The mixture was heated at refluxing temperature for 6 hours, the water layer separated and the oil distilled to obtain 89.4 grams of 1,2,3,4-tetrahydro-1,2,2,4-tetramethylquinoline.

The 1,2,3,4 - tetrahydro - 1,2,2,4-tetramethylquinoline, 89.4 grams, so obtained was dissolved in 570 ml. of dilute hydrochloric acid prepared by diluting concentrated acid with an equal volume of water. The solution was cooled to −3° C. and then while the temperature was kept at 0° C. or below there was slowly added while stirring the reaction mixture a solution of 37.2 grams of sodium nitrite in 226 ml. of water. About 3 hours were required for the addition. The reaction mixture was then neutralized with dilute sodium carbonate solution, the solid product separated by filtration, washed with water and air dried. The 6-nitroso-1,2,3,4-tetrahydro-1,2,2,4-tetramethylquinoline so obtained was reduced to the corresponding 6-amino compound by hydrogenation in a Parr hydrogenator as described in the initial step employing a platinum or palladium catalyst. The temperature during the hydrogenation was 22–65° C. About 90 minutes were required to obtain a pressure drop corresponding to the theoretical 2 moles of hydrogen absorbed per mole of nitroso compound. The product was then purified by fractional distillation, the fraction B. P. 156–162° C./2–3 mm., $n_D^{25}=1.5802$, being collected.

Example 2

6 - methylamino-1,2,3,4-tetrahydro-1,2,2,4-tetramethylquinoline was prepared from the product of Example 1 by methylation. Into a suitable reactor fitted with a reflux condenser was charged 22.7 grams of 6-amino-1,2,3,4 - tetrahydro - 1,2,2,4 - tetramethylquinoline, 17.1 grams of methyl iodide, 14.2 grams of sodium carbonate and 100 ml. of water. The mixture was heated to refluxing temperature for 3 hours, the water layer then separated and the organic layer distilled under reduced pressure. The 6-methylamino-1,2,3,4-tetrahydro-1,2,2,4-tetramethylquinoline distilled at 151–156° C./2 mm., $n_D^{25}=1.5689$. The yield was 19.3 grams.

Example 3

Into a suitable reactor was charged 133 grams of 1,2,3,4-tetrahydro-2,2,4-trimethylquinoline, the intermediate obtained as described in Example 1, dissolved in 256 grams of 25% sulfuric acid solution obtained by diluting 64 grams of ordinary concentrated sulfuric acid with 192 grams of water. The solution was cooled to 0° C. and the temperature kept at 0° C. or below while a solution of 61 grams of sodium nitrite in 102 ml. of water was slowly added. The reaction mixture was then neutralized with dilute sodium carbonate solution and the solid product separated by filtration, washed with water and dried.

The N-nitroso compound obtained as described was rearranged to the 6-nitroso derivative by hydrogen chloride in methanol solution. Into a suitable reactor was charged 100 grams of N-nitroso-1,2,3,4-tetrahydro-2,2,4-trimethylquinoline. A solution of 125 ml. of methanol containing 39.2 grams of hydrogen chloride was cooled to 0° C. and added to the reactor in one portion. The reaction mixture was kept at about 30° C. for one hour and then neutralized with dilute sodium carbonate solution. The solids, 90 grams, were removed by filtration, washed with water and air dried. The 6-nitroso derivative, 60 grams, so prepared was reduced by hydrogenation in a Parr hydrogenator over a palladium catalyst. The temperature of hydrogenation was 22–50° C. and a pressure drop corresponding to the theoretical was observed. The product was purified by distillation under reduced pressure. The 6 - amino - 1,2,3,4-tetrahydro-2,2,4-trimethylquinoline distilled at 138–140° C./3–4 mm., solidified on standing, and the solid found to melt at about 52° C.

For effecting the introduction of an alkyl, aralkyl or alicyclic group on a nitrogen atom in either the 1- or 6-positions of the tetrahydroquinoline nucleus the iodides are the most satisfactory due to their greater reactivity. The bromides are adequate in many instances and in some cases chlorides condense satisfactorily. The reactivity of the chlorides is sharply enhanced by using them in conjunction with a small amount of potassium iodide. The size of the group attached to the nitrogen atoms apparently does not significantly affect the properties of the compounds as anti-exposure agents for elastomers at least in the case of benzyl, cyclohexyl and alkyl radicals up to twelve carbon atoms. This pertains only to non-aromatic substituents. Aromatic substituents contribute entirely different properties and are outside the scope of the invention.

Different routes of synthesis are possible. Instead of starting with a tetrahydroquinoline a dihydroquinoline may be employed in the nitrosation reaction and non-aromatic groups introduced as desired and the product then hydrogenated to the tetrahydroquinoline. However, for some unexplained reason hydrogenation for example of 6-amino-1,2-dihydro-2,2,4-trimethylquinoline is more difficult than hydrogenation of the unsubstituted dihydroquinolines so the tetrahydroquinolines are the preferred intermediates.

The 1,2-dihydro-2,2,4-trialkylquinolines employed as intermediates for the preparation of the new compounds are conveniently prepared by condensing aniline with a methyl ketone,

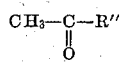

in a molar ratio of at least 1:2 in the presence of a suitable catalyst, e. g. iodine or bromine. It is now generally accepted that the condensation products of aniline with such methyl ketones are 1,2-dihydroquinolines of the structure

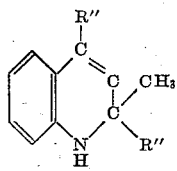

where R″ is a short chain alkyl group as described above. Accordingly, the structure assigned to the new compounds is based upon the accepted configuration of the aforesaid intermediates.

Further examples of the invention are:

6 - ethylamino - 1,2,3,4 - tetrahydro - 2,2,4 - trimethylquinoline
6 - ethylamino - 1,2,3,4 - tetrahydro - 1,2,2,4 - tetramethylquinoline
6 - methylamino - 1,2,3,4 - tetrahydro - 1 - ethyl - 2,2,4-trimethylquinoline
6 - propylamino - 1,2,3,4, - tetrahydro - 2,2,4 - trimethylquinoline
6 - ethylamino - 1,2,3,4 - tetrahydro - 1 - ethyl - 2,2,4-trimethylquinoline
6 - propylamino - 1,2,3,4 - tetrahydro - 1,2,2,4 - tetramethylquinoline
6 - butylamino - 1,2,3,4 - tetrahydro - 1,2,2,4 - tetramethylquinoline
6 - cyclohexylamino - 1,2,3,4 - tetrahydro - 1,2,2,4 - tetramethylquinoline
6 - cyclohexylamino - 1,2,3,4 - tetrahydro - 2,2,4 - trimethylquinoline
6 - octylamino - 1,2,3,4 - tetrahydro - 2,2,4 - trimethylquinoline
6 - octylamino - 1,2,3,4 - tetrahydro - 1,2,2,4 - tetramethylquinoline
6 - decylamino - 1,2,3,4 - tetrahydro - 1,2,2,4 - tetramethylquinoline
6 - decylamino - 1,2,3,4 - tetrahydro - 2,2,4 - trimethylquinoline
6 - dodecylamino - 1,2,3,4 - tetrahydro - 2,2,4 - trimethylquinoline
6 - dodecylamino - 1,2,3,4 - tetrahydro - 1,2,2,4 - tetramethylquinoline
6 - butylamino - 1,2,3,4 - tetrahydro - 1 - butyl - 2,2,4-trimethylquinoline
6 - methylamino - 1,2,3,4 - tetrahydro - 1 - methyl - 2,4-diethyl - 2 - methylquinoline
6 - benzylamino - 1,2,3,4 - tetrahydro - 1 - benzyl - 2,2,4-trimethylquinoline.

As illustrative of the anti-exposure cracking properties in vulcanized sulfur vulcanizable synthetic rubber-like materials, stocks were prepared from butadiene-1,3-styrene copolymer compositions utilizing the following ingredients:

| Stock | A | B | C | D |
|---|---|---|---|---|
| GR-S ..........................parts by weight.. | 100 | 100 | 100 | 100 |
| Carbon black...........................do.... | 50 | 50 | 50 | 50 |
| Saturated hydrocarbon softener..........do.... | 10 | 10 | 10 | 10 |
| Zinc oxide.............................do.... | 4 | 4 | 4 | 4 |
| Stearic acid...........................do.... | 2 | 2 | 2 | 2 |
| Sulfur................................do.... | 1.75 | 1.75 | 1.75 | 1.75 |
| N-Cyclohexyl 2-benzothiazole sulfenamide parts by weight.. | 1.2 | 1.2 | 1.2 | 1.2 |
| 6-Ethoxy-2,2,4-trimethyl-1,2-dihydroquinoline [1] ..................parts by weight.. | | 1.5 | | |
| 6-Amino-1,2,3,4-tetrahydro-1,2,2,4-tetramethylquinoline..............parts by weight.. | | | 1.5 | |
| 6-Methylamino-1,2,3,4-tetrahydro-1,2,2,4-tetramethylquinoline....parts by weight.. | | | | 1.5 |

[1] 6-Ethoxy-2,2,4-trimethyl-1,2-dihydroquinoline is a well-known anti-exposure cracking agent.

The stocks so compounded were cured in a press for 30 minutes at 144° C. The vulcanizates were evaluated under dynamic conditions in an atmosphere containing a definite concentration of ozone. Samples of the stocks were cured in the form of a belt ½″ wide, ¼″ thick and 5%₁₆″ diameter and mounted on 1″ diameter shafts. The ozone concentration was maintained at 20–30 parts per hundred million throughout the test and the shafts were rotated at 75 R. P. M. In this manner a momentary elongation through a range of 0–20% was provided at any portion of the test specimen passing over the shaft. (The apparatus and procedure employed is described in a paper of Creed et al. entitled "An Apparatus for the Evaluation of Ozone Protective Agents for Elastomers under Dynamic Conditions" given at the Cincinnati, Ohio Meeting of the Rubber Division of the American Chemical Society May 1, 1952.) The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

TABLE I

| Stock | Surface Cracking after Flexing in Ozone for— | | | |
|---|---|---|---|---|
| | 8 hrs. | 32 hrs. | 56 hrs. | 80 hrs. |
| A | none | severe | extremely severe | very slight. |
| B | do | none | none | slight. |
| C | do | do | very slight | none. |
| D | do | do | none | |

It is intended to cover all changes and modifications of the examples of the invention herein chosen for purposes of disclosure which do not constitute departures from the spirit and scope of the invention.

What is claimed is:
1. The compounds of the general formula

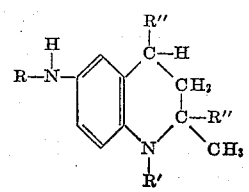

where R and R' are selected from the group consisting of hydrogen, alkyl, aralkyl and alicyclic groups containing less than 13 carbon atoms and R'' represents an alkyl group containing less than 5 carbon atoms.

2. The compounds of the general formula

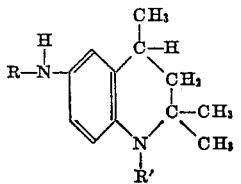

where R and R' represent alkyl groups of one to four carbon atoms.

3. The compounds of the general formula

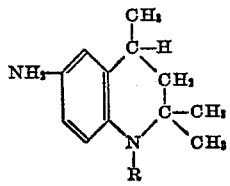

where R represents an alkyl group of one to four carbon atoms.

4. 6-amino-1,2,3,4-tetrahydro-2,2,4-trimethylquinoline.
5. 6-amino-1,2,3,4-tetrahydro - 1,2,2,4 - tetramethylquinoline.
6. 6-methylamino-1,2,3,4-tetrahydro - 1,2,2,4 - tetramethylquinoline.
7. 6-ethylamino-1,2,3,4-tetrahydro-1-ethyl-2,2,4 - trimethylquinoline.

References Cited in the file of this patent
UNITED STATES PATENTS 2,381,771    Paul ------------------ Aug. 7, 1945

OTHER REFERENCES

Ziegler: Berichte, vol. 21, pp. 862–867 (1888).
Wagner et al.: Synthetic Organic Chem., 1953.